United States Patent [19]

Nakao

[11] Patent Number: 4,630,281
[45] Date of Patent: Dec. 16, 1986

[54] ARC FURNACE WITH VARIABLE CAPACITY

[75] Inventor: Katsunori Nakao, Kamakura, Japan

[73] Assignee: Ishikawajima-Harima Jukogyo Kabushiki Kaisha, Tokyo, Japan

[21] Appl. No.: 748,825

[22] Filed: Jun. 26, 1985

[30] Foreign Application Priority Data

Jul. 5, 1984 [JP] Japan .......................... 59-101959[U]

[51] Int. Cl.⁴ ........................ F27B 14/08; F27D 1/00
[52] U.S. Cl. ...................................... 373/71; 373/75;
266/286; 432/248
[58] Field of Search ...................... 373/71, 73, 74, 75,
373/76, 44, 30; 266/280, 281, 283, 285, 286,
900, 190, 193, 194, 241; 432/248, 252, 264, 265,
238

[56] References Cited

U.S. PATENT DOCUMENTS 3,843,106 10/1974 Nanjyo et al. ..................... 373/76 X

FOREIGN PATENT DOCUMENTS 287238 11/1970 U.S.S.R. ................................ 373/71

Primary Examiner—Roy N. Envall, Jr.

[57] ABSTRACT

An arc furnace is provided with a variable-capacity ring which is placed at the top of a furnace body and which is split into a plurality of circumferential sections which in turn define in combination a top furnace wall portion, and a driving mechanism for causing the ring to move horizontally. As the ring is moved radially outwardly or inwardly of the furnace body, the height of the furnace body is varied and consequently the capacity or the volume of the furnace body can be varied. As a result, the overcharging of the charge (scrap) is much facilitated; that is, the number of back charges can be reduced. Furthermore, when the pile of the charge in the furnace body is lowered, the capacity or volume of the arc furnace is decreased so that unwanted thermal losses and oxidation and resulting wear of electrodes can be reduced to a minimum.

1 Claim, 4 Drawing Figures

ARC FURNACE WITH VARIABLE CAPACITY

BACKGROUND OF THE INVENTION

The present invention relates to a steel-making arc furnace whose capacity is variable.

A conventional arc furnace has a predetermined furnace capacity. Therefore, in the case of overcharging the charge (scrap), the overcharged charge is pressed by means of a charging bucket or an operator must climb over the top of the furnace so as to collapse and smooth the pile of the charge. Furthermore, if the arc furnace cannot be filled by one charging, the charge must be charged into the furnace many times.

Since the conventional arc furnaces have a predetermined furnace capacity, there arises the problem that even when the charge is melted and the pile of the charge is lowered, the furnace capacity cannot be varied so that not only the unneeded thermal losses but also electrode consumption due to oxidation and resulting wear of electrodes in the furnace are increased.

In view of the above, according to the present invention, a furnace capacity is made variable so that the charge can be overcharged in a simple manner. Furthermore, when the pile of the charge is lowered, the furnace capacity is decreased so that unneeded thermal losses and oxidation and resulting wear of electrodes can be reduced to a minimum.

DETAILED DESCRIPTION OF THE PREFERRED EMBODIMENT

Referring now to the accompanying drawings, a preferred embodiment of the present invention will be described in detail.

Figure 1:
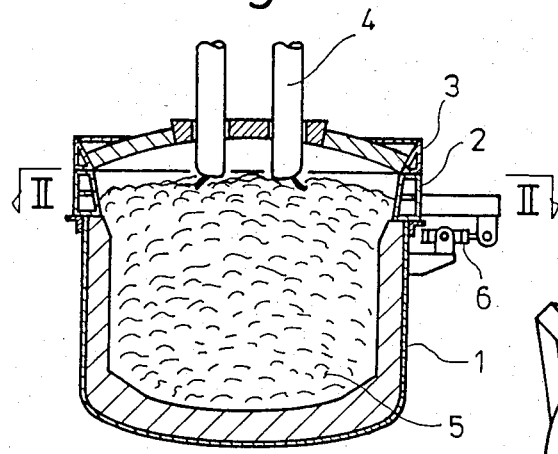
FIG. 1 is a longitudinal sectional view of a preferred embodiment of an arc furnace with a variable capacity in accordance with the present invention.
Figure 2:
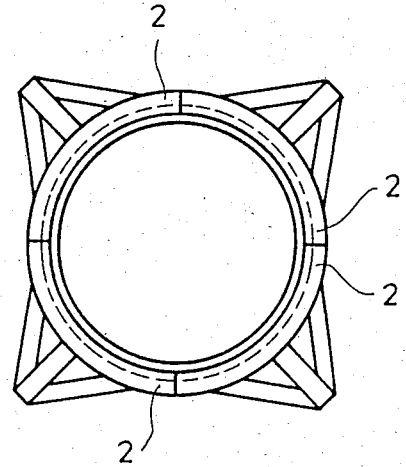
FIG. 2 is a top view looking in the direction indicated by the arrows II in FIG. 1.
Figure 4:
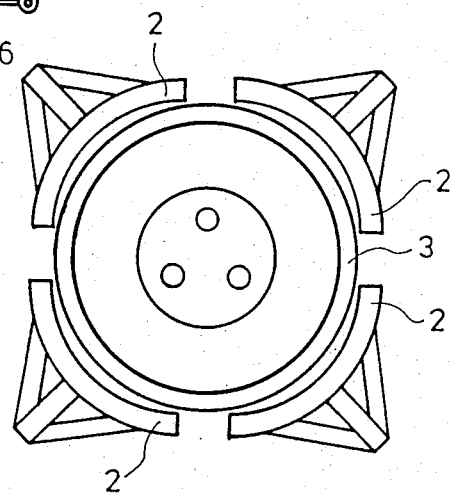
FIG. 4 is a top view looking in the direction indicated by the arrows IV in FIG. 3.

Referring first to FIG. 1, an arc furnace according to the present invention has a furnace body 1. Disposed at the top of the furnace body 1 is a variable-capacity ring 2 which comprises a plurality of circumferentially split sections and which has a water-cooled construction or is made of a refractory material. In this embodiment, the variable-capacity ring 2 is divided into four sections as shown in FIGS. 2 and 4.

As shown in FIG. 1, a roof 3 is placed over the variable-capacity ring 2 and electrodes 4 extend through the roof 3 into the furnace body 1 to melt the charge (scrap) 5.

Figure 3:
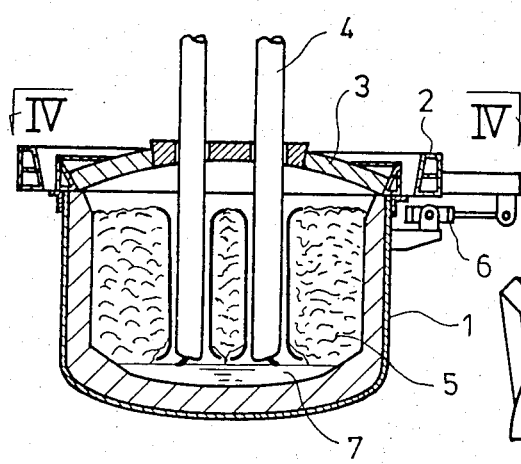
FIG. 3 is a view similar to FIG. 1 but shows a different furnace operation.

A driving mechanism 6 is mounted on the outer wall of the furnace body 1 and is drivingly coupled to the variable-capacity ring 2. In place of the cylinder as shown in FIGS. 1 and 3, an electric motor may be used as a driving mechanism 6. When the driving mechanism 6 is energized, the variable-capacity ring 2 is caused to move radially outwardly and horizontally as shown in FIGS. 3 and 4. In this case, the roof 3 is directly placed at the top of the furnace body 1.

When the variable-capacity ring 2 is placed at the top of the furnace body 1 as shown in FIG. 1, the four sections of the variable-capacity ring 2 are made into contact with the top of the furnace body 1 and with each other to form a ring so that the furnace capacity or volume is increased. Therefore, even when the charge 5 is overcharged, it is not needed to press the charge 5 with the charging bucket and it is not necessary for an operator to climb over the furnace body 1 to collapse and smooth the pile of the charge 5.

When the charge 5 is melted, a pool of molten metal 7 is formed as shown in FIG. 3 and the pile of the charge 5 in the furnace body 1 is lowered. Then the driving mechanism 6 is energized so that the variable-capacity ring 4 is forced to move radially outwardly and horizontally and consequently the roof 3 is placed at the top of the furnace body 1. As a result, the furnace capacity or volume is decreased so that unneeded thermal losses are minimized and the red heated portions of the electrodes 4 in the furnace body 1 are decreased in length.

As described above, according to the present invention, the capacity or volumes of the arc furnace can be varied by means of the variable-capacity ring so that the overcharge can be facilitated and the number of back charges may be reduced. Moreover, when the pile of the charge is lowered, thermal losses and electrode consumption can be minimized.

What is claimed is:

1. In a steel-making arc furnace comprising a furnace body and a roof and wherein scrap is charged from above, the improvement comprising a ring-shaped top wall portion disposed at the top of said body and divided into a plurality of circumferential sections, and means for selectively driving said circumferential sections horizontally and radially outwardly into an inoperative position so that said roof can be directly placed on said furnace body, and horizontally and radially inwardly into an operative position so that said roof can be placed on said furnace body via said ring-shaped top wall portion, whereby the capacity of the furnace is variable.

* * * * *